UNITED STATES PATENT OFFICE.

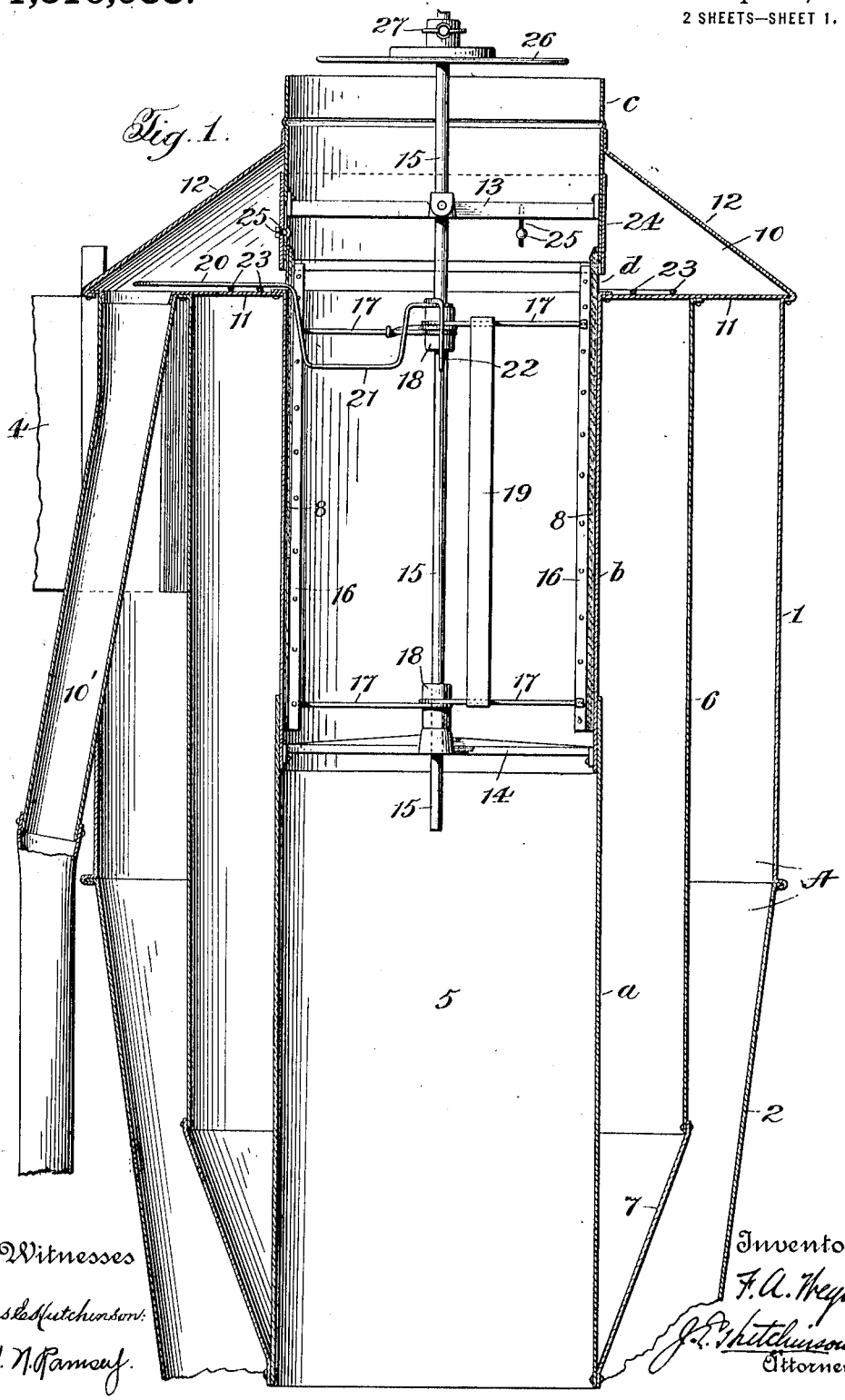

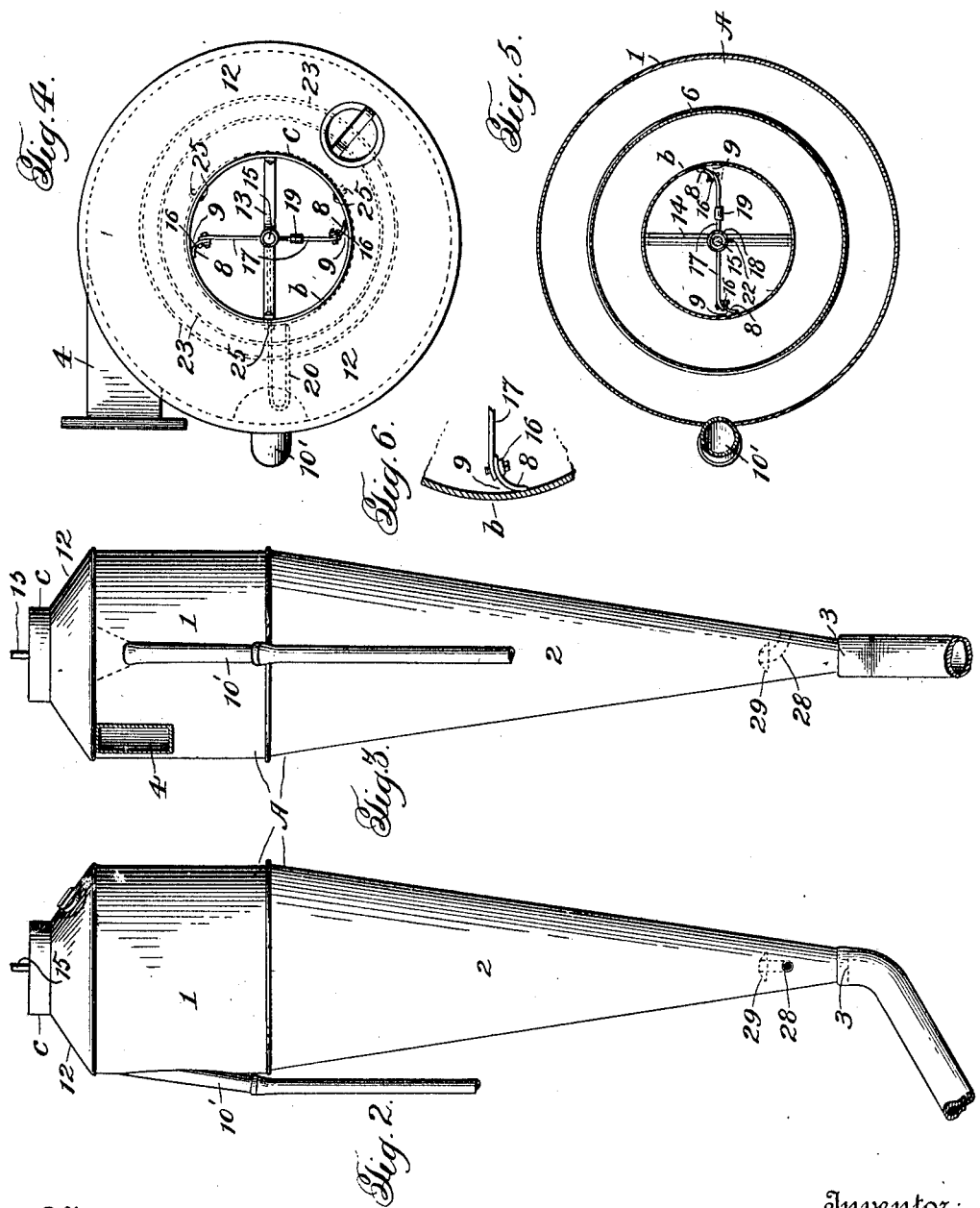

FREDERICK A. WEGNER, OF BUFFALO, NEW YORK.

DUST-COLLECTOR.

1,316,988.   Specification of Letters Patent.   Patented Sept. 23, 1919.

Application filed May 1, 1915. Serial No. 25,182.

*To all whom it may concern:*

Be it known that I, FREDERICK A. WEGNER, a citizen of the United States, residing at Buffalo, in the county of Erie and State of New York, have invented certain new and useful Improvements in Dust-Collectors, of which the following is a specification, reference being had therein to the accompanying drawing.

This invention relates to dust collectors of the cyclone type, in which dust or other solid matter is separated from air by reason of the rapid whirling of the dust laden air in a substantially conical separating chamber, the features here illustrated constituting improvements upon the structure disclosed in my co-pending application, filed August 24, 1914, Serial Number 858,829.

The invention has for its primary object to provide a machine of the character specified wherein the leakage of dust from the air outlet is materially reduced, or, in fact, practically eliminated, and the machine generally improved in other respects so that the separating action is rendered effective.

A further object of the invention is the provision of a dust collector of this type wherein the separating chamber is so proportioned and constructed as to effect the most perfect separation of the fine dust from the air, means being provided for preventing the expanding of the air entering the separating chamber and furthermore causing such air to be pinched or compressed as it continues downwardly through the separating chamber, thereby increasing the velocity of the air and effectually forcing the dust particles into close proximity to the outer wall of the separating chamber, allowing only pure air to escape at the top of the collector.

A still further object of the invention is the provision of a series of revolving wipers arranged within the tubular guard or exhaust tube of the collector, which are adapted to coöperate with the wall of said guard, forming pockets between said wipers and the guard for collecting any dust remaining in the air passing through said guard, which dust particles are thrown against the wall of the guard by the whirling action of the air passing therethrough. In this connection it is to be noted that due to the suction created by the device these dust particles are collected within the pockets and discharged therefrom into a suitable auxiliary chamber at the top of the apparatus from whence said dust particles are carried back to the eye of the fan or through a pipe leading from said auxiliary chamber to the fan of a separate collector.

A further object of the invention is the provision of a revolving agitator arm moving within the auxiliary chamber at the top of the apparatus, thus preventing the dust collected from settling in this chamber, which would otherwise hinder the successful operation of the apparatus.

Another object of the invention is the provision of an adjustable sleeve or collar for varying the inlet opening to the auxiliary chamber to suit certain conditions, the opening under usual circumstances being adjusted to a size where it equals the area of the suction pipe leading from said auxiliary chamber.

A still further object of the invention is to provide a governor or adjustable disk, located centrally with respect to the outlet end of the guard or exhaust tube and capable of being lowered within the guard, said governor serving as a means for permitting the desired amount of "down pressure" in the separating chamber to be obtained.

Another object of the invention is the provision of means at the lower end of the tapered or conical portion of the separating chamber, near the dust discharge opening thereof, for allowing outside air to be brought in at this point of the separating chamber, thereby preventing the forming of a vacuum space in the center of the tapered or conical portion of the separating chamber, which necessarily prevents the formation of an upright column of dust laden air in the chamber.

In the drawings:—

Figure 1 is a central sectional elevation of the upper part of a dust collector embodying the invention;

Fig. 2 is a side elevation of the dust collector on a somewhat smaller scale than that shown in Fig. 1;

Fig. 3 is a similar view of the collector taken from a different angle;

Fig. 4 is a top plan view of the collector on a somewhat larger scale than that shown in Figs. 2 and 3;

Fig. 5 is a cross sectional view of the collector taken on a line through the cylindrical portion of the separating chamber, and Fig. 6 is a detail view of one of the wipers.

Referring to the drawings, A denotes the separating chamber, which comprises the usual upper cylindrical portion 1, and a lower tapered or conical portion 2, terminating at its lower end in a dust discharge opening 3. The upper cylindrical portion is provided with the usual tangential inlet passage 4, for the dust laden air, and 5 represents the usual tubular guard or exhaust tube forming an outlet through which the purified air escapes. In the present instance, however, the guard is made up of three tubular sections, $a$, $b$ and $c$, the sections $a$ and $b$ having telescoping engagement, one with the other, and the section $c$ being spaced from the section $b$ a certain distance, forming an annular opening $d$, through the guard, for the passage of dust to an auxiliary chamber, as hereinafter more fully set forth.

It is to be noted that the conical portion 2 of the separating chamber is of comparatively great length and small diameter, being shaped like a long slender frustum of a cone, and has a relatively small dust discharge opening located at the smaller end of the separating chamber. The wall of the separating chamber is preferably shaped like the surface of an inverted cone, the altitude of which is three times the diameter of its base. As clearly set forth in my copending application, herein referred to, a chamber proportioned in this manner has been found to give the best results and to attain the best separation, so that the air leaving the collector is much more free from fine dust than in separators having the conical part of the separating chamber of different proportions.

Suitable means is provided for restricting a portion of the air space through which the air passes on its way downwardly through the separating chamber, in such a manner as to form a relatively long annular restricted space adjacent the wall of the cylindrical portion 1 of the separating chamber in which the dust laden air whirls. This means serves to force the dust particles into close proximity to the outer wall of the separating chamber for the purpose of assisting the separation of the fine dust from the air, and said means is so spaced from the outer wall of said cylindrical portion that the air entering the separating chamber is prevented from expanding, and thereby the velocity of the air is in no way diminished. This is accomplished, in the construction illustrated, by a tubular restricting member, shield or apron, 6, which is arranged parallel with the outer wall of the cylindrical chamber, and spaced therefrom a distance equal to the size of the air intake, thereby, as stated, preventing the air from expanding as it enters at the top of the collector. The restricting member or apron extends from the top of the cylindrical portion of the separating chamber for the full length thereof, and then projects downwardly for about one-third of its length into the tapered or conical portion 2, narrowing the space surrounding said apron about one-third, thereby causing the air to be pinched or compressed at this point in its travel through the collector, and increasing the velocity of the air which continues down the tapered or conical portion of the separating chamber, effectually forcing the dust particles into close proximity to the outer wall of the separating chamber and allowing only the pure air to escape at the top of the collector, through the exhaust tube or guard. The space between the guard or exhaust tube and the apron 6, which depends from the top of the collector, is closed at the bottom by an inclined wall, indicated at 7, in Fig. 1 of the drawings, said wall forming an extension of the apron and at its lower end being fastened to the lower edge of the guard or exhaust tube.

The air escaping from the dust collector whirls at a high velocity so that a certain amount of separation takes places in the air escape opening of the collector. In order to prevent such small quantities of dust which may find their way into the air escape opening from passing out with the purified air, revolving wipers 8 are mounted within the section $b$ of the guard or exhaust tube, said wipers being of a length substantially the same as that of said section, and coöperating with the wall thereof to form pockets 9, which receive and collect any dust particles which are thrown outwardly by centrifugal action against said wall. The wipers are preferably extended at their upper ends into the tubular section $c$, for a short distance so as to overlap the annular openings $d$. The dust particles which are collected in these pockets 9 are immediately lifted, due to suction, into an auxiliary chamber 10, located at the top of the collector and above the cylindrical portion of the separating chamber, the dust particles entering said auxiliary chamber through the annular opening in the exhaust tube or guard. In this connection, it may be stated that the top 11 of the cylindrical portion 1, of the separating chamber, forms the bottom of the auxiliary chamber, and the section $c$ of the tubular guard constitutes the inner wall thereof, a conical or tapered hood 12 surrounding the section $c$ being provided as the top and outer wall of said auxiliary chamber. The dust collected in this auxiliary chamber may be conveyed to any suitable point through a tube 10' leading from the bottom of said chamber.

Extending transversely across the tubular guard are two supporting bars 13 and 14, the upper bar 13 being secured at its ends to opposite sides of the section $c$ of the tubular guard, and the lower bar 14 being likewise fastened at the lower end of the section $b$ of said guard. Rigidly secured to these supporting bars is a vertical rod 15, centrally arranged within the tubular guard, and forming a shaft upon which the wiper structure is journaled. The wipers are riveted or otherwise secured to metal strips 16, and to these strips are secured arms 17, connected at their other ends to hubs 18, loosely mounted upon the rod or shaft 15. A blade 19 is also provided, serving as a brace between upper and lower sets of arms 17, and also as a means against which the whirling air, as it passes through the tubular guard, may impinge, to cause the rotation of the wiper structure.

Also journaled upon the rod or shaft 15 is an agitator arm, the same being preferably formed of a wire, bent upon itself at its free end, as indicated at 20, and projecting within the auxiliary chamber, through the annular opening in the tubular guard. This agitator arm is preferably bent intermediate its ends to form a downwardly projecting portion 21, and a portion 22 is provided at its inner end, which portions 20 and 21 serve as stays to hold said agitator arm in fixed relation with respect to the wiper structure. In this connection, it is to be noted that as the wiper structure is revolved, due to the whirling action of the air passing through the tubular guard, the agitator arm is also revolved about the rod or shaft 15, as an axis, in which event the free end of said agitator arm is caused to travel within the auxiliary chamber and prevent any dust from settling in said chamber. Furthermore, this agitator arm is supported from the bottom of said auxiliary chamber upon circular track-ways 23, in the form of wires, eccentrically arranged with respect to the tubular guard, said wires being thus arranged to prevent the wear upon the agitator arm at any one point, as will be obvious.

Surrounding the section $c$ of the tubular guard and slidably mounted thereon, is an adjustable sleeve 24, which is capable of being moved to a position below the lower edge of said section $c$ for the purpose of varying the size of the annular opening $d$. A pin and slot connection 25 between the adjustable sleeve and the section $c$ is provided to permit of this adjustment. Under usual conditions, the size of this annular opening should be adjusted to equal the area of the suction pipe leading from the auxiliary chamber.

Adjustably mounted at the upper end of the rod or shaft 15 is a regulating disk or governor 26, the same being centrally located with respect to the outlet end of the tubular guard and capable of being lowered within the guard to the desired position, for obtaining the proper amount of "down pressure" in the separating chamber. This regulating disk or governor may be held in its various positions by means of the thumb-screw 27.

At the lower end of the tapered or conical portion of the separating chamber, and a slight distance above the dust discharge opening 3, is an open-ended tube 28, centrally located with respect to the separating chamber, and connected with the outer wall of said chamber for providing an entrance for outside air at this point of the collector. In this connection, it has been found that under certain conditions a vacuum in the center of the separating chamber will be formed, extending upwardly from the dust discharge opening for a certain distance, thereby permitting the formation of a column of dust, which dust column sometimes is blown upwardly through the tubular guard or exhaust tube. In order to prevent this vacuum and the consequent formation of the dust column, outside air is allowed to enter the separating chamber, as above described.

In the event that the air tube 28 should, under certain conditions, be insufficient for furnishing the proper amount of air to take care of the occurrence of the entire vacuum, which would otherwise form, and certain dust particles be lifted from the lower edge of the dust discharge openings, as before, an inclined flange or ring 29 is provided upon the upper open end of the air tube 28, thus providing a means for preventing any dust particles from being carried into the upper part of the separating chamber. In this connection, it may be noted that any such dust particles which may be lifted at this point of the collector cannot rise over the flange or ring and hence drop down and find their way out through the dust escape opening.

While I have shown and described in some detail a specific embodiment of the invention, well adapted for performing the function herein set forth, it will be apparent that many changes in details of construction might be made without departure from the spirit of my invention and within the scope of the appended claims.

I claim:—

1. In a dust collector, the combination of a separating chamber having a cylindrical wall, and a tapering wall forming an extension of said cylindrical wall, a tubular guard, a restricting member surrounding said tubular guard and arranged parallel with the cylindrical wall of the separating chamber, and means for closing the space between said tubular guard and the restricting member at the lower ends thereof, said restricting member extending to a position within the tapering wall for narrowing the space through which the dust laden air passes, thereby increasing the velocity of the air at this point in the separating chamber.

2. In a dust collector, the combination of a separating chamber having a cylindrical wall, and a tapering wall depending therefrom, a tubular guard, a restricting member arranged parallel with the cylindrical wall and spaced therefrom for a distance which makes the cross sectional area between them equal the cross sectional area of the air intake, and an inclined wall or conical member connecting the lower ends of the tubular guard and restricting member, said restricting member extending within the tapering wall, thereby narrowing the space through which the dust laden air passes and increasing the velocity of the air at this point in the separating chamber.

3. In a dust collector, the combination of a separating chamber having a tangential inlet opening and discharge openings for air and dust, a tubular guard, and revolving wipers arranged within the guard and coöperating with the wall thereof to form pockets for collecting the dust thrown against said wall by the whirling action of the air passing through the guard.

4. In a dust collector, the combination of a separating chamber having a tangential inlet opening and discharge openings for air and dust, a tubular guard, revolving wipers arranged within the guard and coöperating with the wall thereof to form pockets for collecting the dust thrown against said wall by the whirling action of the air passing through the guard, and a chamber adjacent said pockets and adapted to receive the dust collected by said pockets.

5. In a dust collector, the combination of a separating chamber having a tangential inlet opening and discharge openings for air and dust, a tubular guard, an auxiliary chamber communicating with said tubular guard, and revolving wipers arranged within the guard and coöperating with the wall thereof to form pockets for collecting the dust thrown against said wall by the whirling action of the air passing through the guard, said wipers serving to direct the dust into the auxiliary chamber.

6. In a dust collector, the combination of a separating chamber, having an inlet opening and discharge openings for air and dust, a tubular guard, a fixed shaft centrally arranged with respect to the guard, arms journaled upon said shaft, and wipers fixed to the free ends of said arms and coöperating with the wall of said guard to form pockets for collecting the dust thrown against said wall by the whirling action of the air passing through the guard.

7. In a dust collector, the combination of a separating chamber having an inlet opening and discharge openings for air and dust, a tubular guard, a fixed shaft centrally arranged with respect to the guard, upper and lower sets of arms journaled upon said shaft, wipers fixed to the free ends of said arms, and coöperating with the wall of the guard to form pockets for collecting the dust thrown against said wall by the whirling action of the air passing through the guard, and a blade carried by said arms and against which the whirling air is adapted to impinge for causing the wipers to revolve within the guard.

8. In a dust collector, the combination of a separating chamber, a tubular guard forming an outlet for the purified air, an auxiliary chamber communicating with the guard through an annular opening therein, and means for varying the size of said annular opening.

9. In a dust collector, the combination of a separating chamber, a tubular guard forming an outlet for the purified air, an auxiliary chamber communicating with the guard through an annular opening therein, and a sleeve surrounding the guard and capable of adjustment for varying the size of said annular opening.

10. In a dust collector the combination of a separating chamber, a tubular guard forming an outlet for the purified air, an auxiliary chamber communicating with the guard through an annular opening therein, means for varying the size of said annular opening, revolving wipers arranged within the guard and coöperating with the wall thereof to form pockets for collecting the dust and conveying it to the annular opening, and an air tube entering the chamber and discharging air at a point directly above the dust outlet.

11. In a dust collector, the combination of a separating chamber, a tubular guard having an outlet for the purified air, an auxiliary chamber communicating with the guard through an annular opening therein, an agitator arm journaled within said guard and projecting within the chamber through the annular opening, and a track-way for supporting said agitator arm in its traveling movement within the chamber.

12. In a dust collector, the combination of a separating chamber, a tubular guard having an outlet for the purified air, an auxiliary chamber communicating with the guard through an annular opening therein, an agitator arm journaled within said guard and projecting within the chamber through the annular opening, and a track way for supporting said agitator arm in its traveling movement within the chamber, said track way being eccentrically arranged with respect to the axis of the agitator arm.

13. A separating chamber having means for causing dust laden air to whirl therein, an outlet for the purified air, an outlet at the bottom of the chamber for the discharge of dust, and an air tube entering the chamber from the side thereof, said tube centrally located with respect to the chamber for delivering air in an upward direction to a point directly above the discharge outlet.

14. A separating chamber having means for causing dust laden air to whirl therein, an outlet for the purified air, an outlet at the bottom of the chamber for the discharge of dust, a tube centrally located with respect to said chamber near the bottom thereof for delivering air in an upward direction within the chamber, and an inclined ring or guard surrounding the outlet end of said tube.

15. In a dust collector, the combination of a separating chamber, a tubular guard forming an outlet for the purified air, an auxiliary chamber communicating with the guard through an annular opening therein, and revolving wipers arranged within the guard and coöperating with the wall thereof for collecting the dust thrown against said wall by the whirling action of the air passing through the guard, said wipers extending to a position where they overlap the annular opening formed in said guard.

In testimony whereof I affix my signature in presence of two witnesses.

FREDERICK A. WEGNER.

Witnesses:
DORSEY W. KELLEY,
MARIE K. TRILLER.

Copies of this patent may be obtained for five cents each, by addressing the "Commissioner of Patents, Washington, D. C."